(12) United States Patent
Gibson

(10) Patent No.: US 6,550,459 B2
(45) Date of Patent: Apr. 22, 2003

(54) GASEOUS FUEL SYSTEM FOR BI-FUEL ENGINES

(75) Inventor: Richard D. Gibson, Oshawa (CA)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/766,963

(22) Filed: Jan. 23, 2001

(65) Prior Publication Data

US 2002/0096154 A1 Jul. 25, 2002

(51) Int. Cl.[7] .......................... F02B 43/00; F02M 21/02
(52) U.S. Cl. ........................................ 123/527; 123/469
(58) Field of Search ................................ 123/527, 445, 123/468, 469, 470

(56) References Cited

U.S. PATENT DOCUMENTS

| 5,713,336 A | * | 2/1998 | King et al. | .................. 123/525 |
| 5,881,701 A | * | 3/1999 | King et al. | .................. 123/527 |
| 6,371,092 B1 | * | 4/2002 | Guglielmo et al. | ......... 123/527 |

* cited by examiner

Primary Examiner—Henry C. Yuen
Assistant Examiner—Hai Huynh
(74) Attorney, Agent, or Firm—Laura C. Hargitt

(57) ABSTRACT

A gas fuel system for a bi-fuel engine includes an injector block assembly that supports gas fuel injectors between an injector block and an inlet header. The block assembly may be mounted beside or behind the engine remote from the engine intake ports where gasoline fuel or gaseous fuel (gas) may be injected for powering the engine. The block assembly connects the injectors through individual distribution lines with separate port openings of an adapter plate mounted between the air intake manifold and the engine intake ports to provide for injection of gas to the intake ports from the remote location. Mounting of the injectors in the remote block assembly, which feeds the adapter, avoids changes to a developed gasoline fuel system in the engine, thus reducing development and production costs. The block assembly may also be modified to use other available gas injectors without affecting the conventional engine components.

3 Claims, 2 Drawing Sheets

GASEOUS FUEL SYSTEM FOR BI-FUEL ENGINES

TECHNICAL FIELD

This invention relates to gaseous fuel systems for engines and, in particular, to a system suitable for use in bi-fuel engines as well as in other engines.

BACKGROUND OF THE INVENTION

It is known in the art relating to bi-fuel engines for vehicles to provide independent gasoline and gaseous fuel (gas) injection systems for alternatively operating the vehicle on either gasoline or gas as a fuel. Systems using liquefied petroleum gas (LPG) in gaseous form or compressed natural gas (CNG) are currently of interest. Such bi-fuel systems offer the environmental benefits of low emission technology without the refueling limitations and short driving range of dedicated fuel vehicles.

A factor in the cost of such vehicle systems is the cost of modifying the well developed gasoline fuel system of a current vehicle engine to accept the gas fuel system. Engine modifications that change the relationship of the gasoline fuel injectors with the air induction system could not only increase the assembly and development costs but could require additional testing for both emission regulation compliance and fuel system collision integrity. Such modifications may include alteration of cylinder heads, manifolds and/or combustion chamber configurations to accommodate gas fuel injectors in addition to the gasoline fuel injectors.

SUMMARY OF THE INVENTION

The present invention provides a gas fuel injection system that may be added to an engine having a proven gasoline fuel injection system with a minimum of modifications and a limited requirement for further development and testing.

The gas fuel system includes an injector block that connects with the outlet ends of gas fuel injectors. An inlet header may be included that connects with the inlet ends of the injectors to form an injector block assembly that may be located in a sheltered vehicle location away from the forward portion of the engine in the vehicle. The gas injectors sequentially admit pressurized gas to gas distribution lines connecting with the engine intake ports. Preferably, the distribution lines connect with gas distributors of any suitable type located in intake port openings of an adapter. The adapter is preferably formed as a plate that is fitted between the engine cylinder head, or other intake port defining body, and an associated intake manifold with the intake port openings of the adapter aligned with the engine intake ports.

The inlet header of the system defines a plenum connected with a pressurized gas fuel supply including a pressure regulator and a gas shutoff valve. The fuel supply delivers gas in gaseous form through the shutoff valve and the pressure regulator to the inlet header of the injector block assembly from which the individual injectors are fed. The injectors may be any type of gas injector suitable for engine intake port injection. The inlet header and injector block are made to sealingly connect with the particular injectors selected and the header and block are connected by suitable supports such as struts or rods to hold the injector block assembly together as a unit and maintain the injectors in place in the assembly.

These and other features and advantages of the invention will be more fully understood from the following description of certain specific embodiments of the invention taken together with the accompanying drawings.

DESCRIPTION OF THE PREFERRED EMBODIMENT

Figure 1:
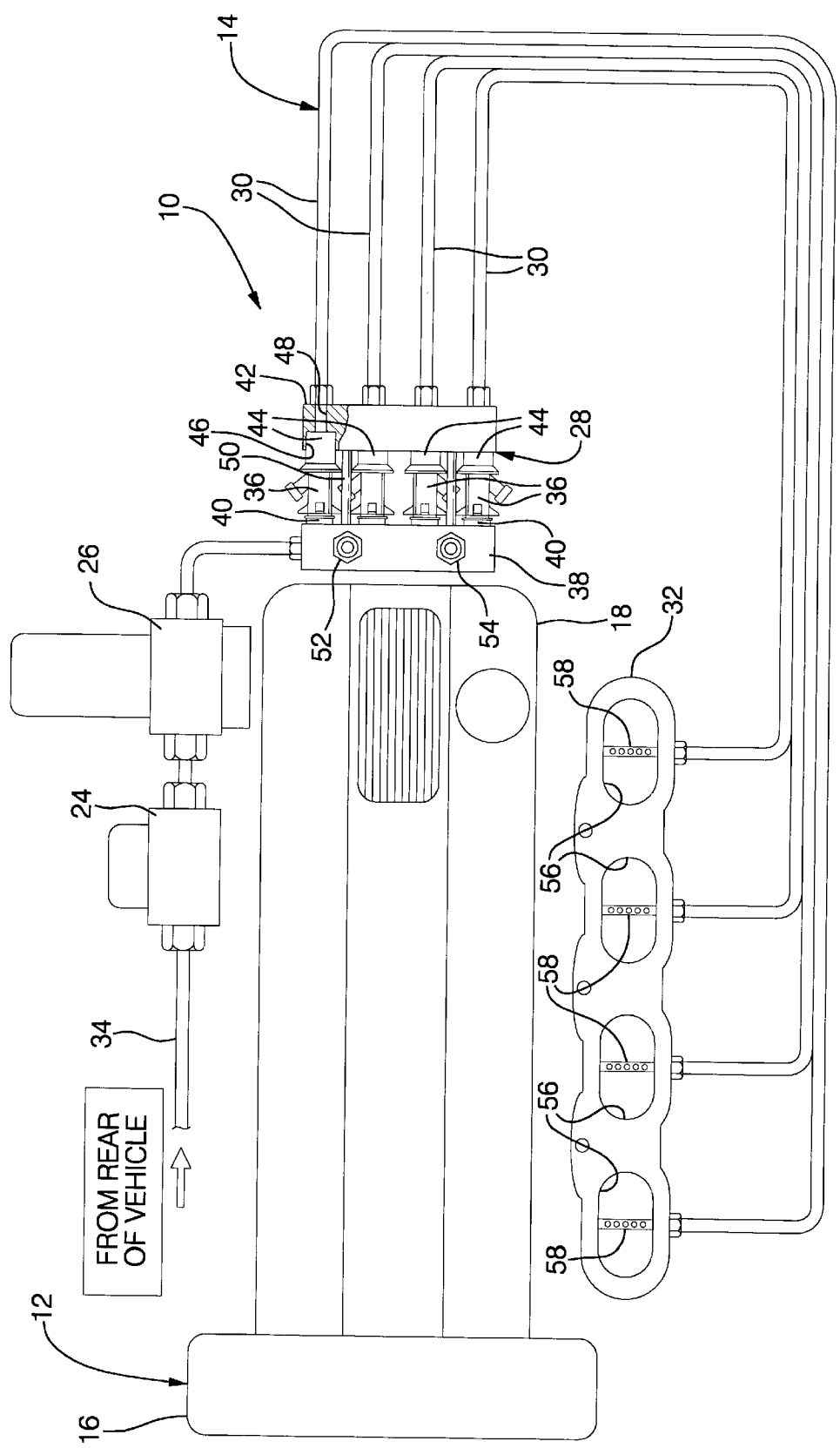
FIG. 1 is a plan view of a bi-fuel engine with gas fuel system of the invention mounted transversely in a front wheel drive vehicle.

Referring now to the drawings in detail, numeral 10 generally indicates a vehicle engine compartment in which is mounted a four cylinder in-line bi-fuel engine 12. A suitable gasoline fuel injection system, not shown, is connected with the engine. A gaseous fuel (gas fuel) system 14 is also connected with the engine to provide vaporized gas fuel, for example from compressed natural gas (CNG) or liquefied petroleum gas (LPG), as a primary alternative fuel to power the bi-fuel engine.

FIG. 1 shows a plan view of the engine and portions of the gas fuel system as mounted in the vehicle engine compartment. Engine 12 has an accessory end 16 conventionally facing toward the right side of the vehicle and an output end 18 connected with a transmission, not shown, and facing toward the left side of the vehicle. An intake manifold 20 is mounted on the side of the engine facing toward the front of the vehicle. The manifold connects with engine intake ports 22 into which conventional gasoline injectors spray fuel when the engine is operating with gasoline fuel.

The gas fuel system 14 of the invention includes conventional gas storage and delivery means, not shown, mounted in a suitable location toward the rear of the vehicle. The storage means is connected in series from the rear of the vehicle to a shut off valve 24, a gas pressure regulator 26 and an injector block assembly 28. These components are preferably mounted away from the front of the vehicle at a location beside or behind the engine where collision damage is less likely to be encountered. FIG. 1 shows a preferred mounting location at the output end 18 of the engine, facing the left side of the vehicle and above the transmission, not shown. From the injector block assembly 28, separate bundled gas distribution lines or tubes 30 connect with an adapter plate 32 sandwiched between the engine intake ports and the intake manifold 20. As shown, the distribution lines 30 enter the adapter plate 32 from below in a location close to the engine and sheltered behind the intake manifold from the front of the vehicle.

Figure 2:
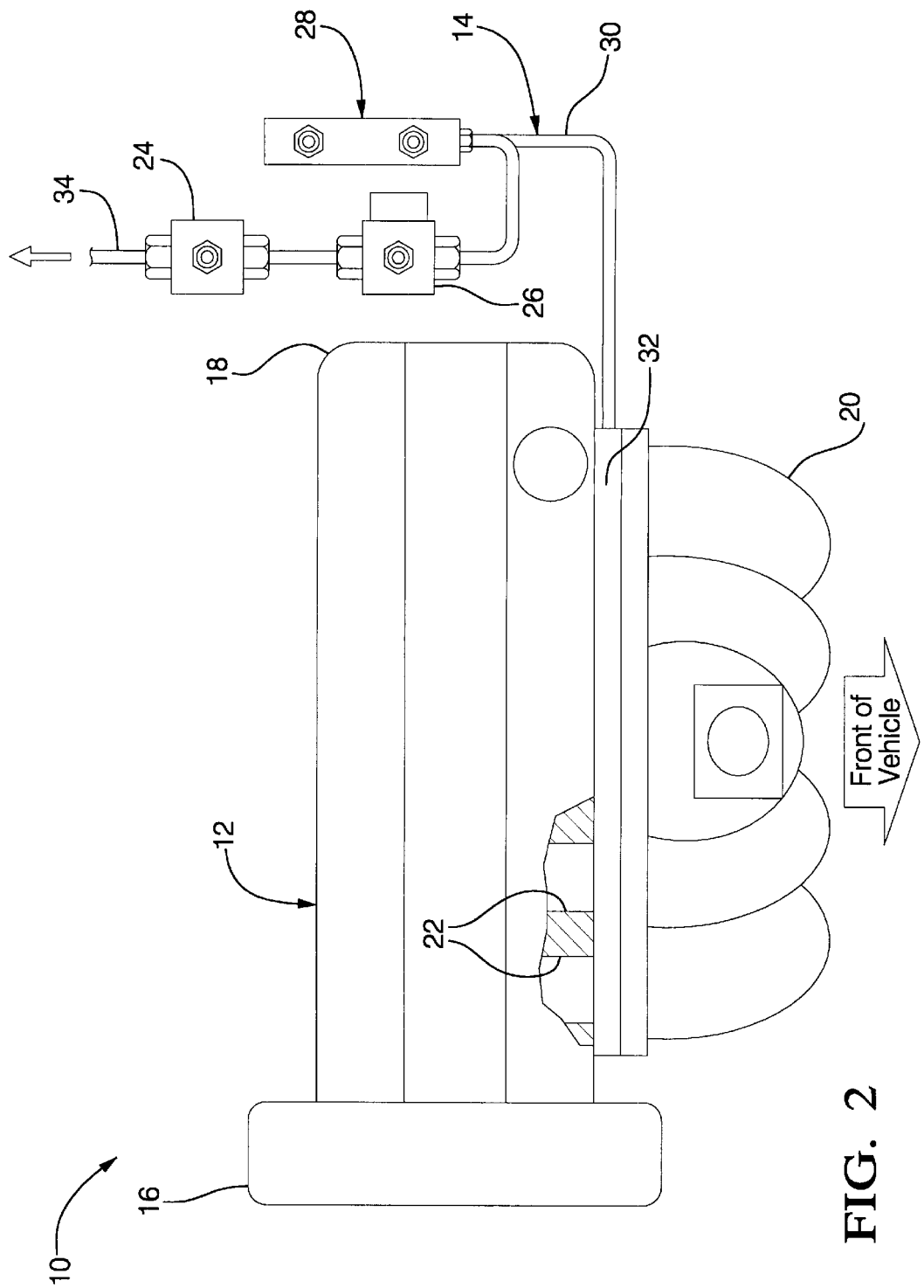
FIG. 2 is a side view of the gas fuel system shown in schematic relation to a plan view of an associated engine.

FIG. 2 illustrates the engine 12 with the side views of the components displayed in a schematic connection diagram. The shutoff valve 24 and pressure regulator 26 are shown with a pressurized gas connecting line 34, which extends from the rear of the vehicle but is shown for convenience alongside the engine 12. The gas connecting line 34 could be bundled together with the gasoline fuel line or lines extending from the rear of the vehicle to the engine compartment in the front.

The injector block assembly 28 includes four gas injectors 36, one for each engine cylinder. The injectors are clamped between an inlet header 38, connected with inlet ends 40, and an injector block 42, connecting with outlet ends 44 of the injectors. The injector outlet ends 44 are received in cup portions 46 of internal through passages 48 of the injector block 42. The injector block 42 is secured to the inlet header 38 by studs 50, or any other suitable support or connecting means, that hold the gas injectors 36 in sealed connection between the members 38, 42 of the injector block assembly 28. The inlet header 38 preferably also mounts a pressure sensor 52 and a temperature sensor 54 for use in supplying operating condition information to gas system control means, not shown.

The passages 48 of the injector plate are connected with the separate tubes or gas distribution lines 30 which are packaged in a bundle leading to the adapter plate 32. Plate 32 includes four intake port openings 56 positioned between separate runners of the intake manifold 20 and the associated intake ports 22 of the engine to carry intake air into the engine cylinders, not shown. The gas distribution lines 30 connect with the port openings 56 through any suitable form of gas distributors 58. The distributors could be as simple as inlet passages in the adapter plate connecting with the port openings 56 or as complex as distributor rings disposed in the air stream through the port openings 56. In FIG. 2, the distributors 58 are injection tubes extending across the openings 56 and perforated to distribute and mix gas fed to the distributors 58 with the air passing from the intake manifold 20 through the port openings 56 into the engine intake ports 22.

In operation, gas fuel is delivered from the supply in the rear of the vehicle through the gas connecting line 34, shutoff valve 24 and pressure regulator 26 to the inlet header 38 at a controlled inlet pressure. The gas is then delivered to the four gas fuel injectors 36, which are sequentially actuated to deliver pulses of pressurized gas to their respective gas distribution lines 30. The gas pulses pass through the lines 30 and inject the gas sequentially from the respective distributors 58 into the intake port openings 56 of the manifold adapter plate 32 for mixing with air from the intake manifold 20. When the gas valve 24 is shut off, the engine may be operated on gasoline delivered through the conventional gasoline injection system of the bi-fuel engine 12.

The shutoff valve 24 and pressure regulator 26 may be located beside the output end of the engine 12, as shown in FIG. 1, or may lie to the rear of the engine in the engine compartment. The injector block assembly 28 is also located remotely beside or behind the engine instead of having the gas fuel injectors 36 mounted directly on the engine 12 or intake manifold 20. The remote separate assembly 28 and use of the adapter plate 32 permits conversion of an engine for bi-fuel operation without requiring modification of the gasoline fuel rail and gasoline injectors so that the gasoline fuel system is unmodified and should not require additional compliance testing. Also, the gas fuel system may be easily modified to use available alternative models of gas fuel injectors by altering the separate injector block and inlet header as necessary. Changes to the conventional engine components themselves are thus avoided and the cost of conversion to other gas injectors is reduced.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A vehicle having an engine mounted transversely in a forward engine compartment, the engine having intake ports and an intake manifold connected with the intake ports on a forward side of the engine, and a fuel system comprising:

a pressurized gaseous fuel supply;

a plurality of gas fuel injectors connected with the fuel supply for receiving pressurized gas from the fuel supply;

a common injector block receiving the injectors; and gas distribution lines, each connected with an outlet of one of the injectors and a corresponding one of the intake ports, to conduct gas fuel from the injectors to the intake ports;

the injectors being operable in timed relation to discharge pressurized fuel from the fuel supply to the distribution lines for delivery to the intake ports, and the injectors, the injector block and the pressurized fuel supply being positioned at a distance from the engine intake ports and at a location other than between the engine and a forward portion of the vehicle, and the connections of the gas distribution lines with the corresponding intake ports being sheltered by the intake manifold from said forward portion of the vehicle.

2. A vehicle having an engine mounted transversely in a forward engine compartment, the engine having intake ports and an intake manifold connected with the intake ports on a forward side of the engine, and a fuel system comprising:

a pressurized gaseous fuel supply;

a plurality of gas fuel injectors connected with the fuel supply for receiving pressurized gas from the fuel supply;

a common injector block receiving the injectors; and gas distribution lines, each connected with an outlet of one of the injectors and a corresponding one of the intake ports, to conduct gas fuel from the injectors to the intake ports;

the injectors being operable in timed relation to discharge pressurized fuel from the fuel supply to the distribution lines for delivery to the intake ports, and the injectors, the injector block and the pressurized fuel supply being positioned at a distance from the engine intake ports and at a location other than between the engine and a forward portion of the vehicle;

wherein an adapter plate is mounted between the engine intake ports and the intake manifold on a side of the engine facing said vehicle forward portion, the plate including intake port openings connecting separate intake manifold runners with associated ones of the engine intake ports, and the gas distribution lines connecting with the plate intake port openings at sheltered locations rearward of the manifold.

3. A vehicle as in claim 2 wherein said sheltered locations are below the adapter plate.

* * * * *